United States Patent
Klitsner et al.

(10) Patent No.: US 8,032,705 B2
(45) Date of Patent: Oct. 4, 2011

(54) METHOD AND APPARATUS FOR PROVIDING GAMES AND CONTENT

(75) Inventors: Dan Klitsner, Larkspur, CA (US); Gary Levenberg, San Francisco, CA (US); Brian Clemens, San Francisco, CA (US); Joe Forest, Amesbury, MA (US)

(73) Assignee: Kid Group LLC, San Francisco, CA (US)

( * ) Notice: Subject to any disclaimer, the term of this patent is extended or adjusted under 35 U.S.C. 154(b) by 1106 days.

(21) Appl. No.: 11/360,170

(22) Filed: Feb. 22, 2006

(65) Prior Publication Data

US 2006/0287110 A1 Dec. 21, 2006

Related U.S. Application Data

(60) Provisional application No. 60/682,183, filed on May 17, 2005.

(51) Int. Cl.
*G06F 12/00* (2006.01)

(52) U.S. Cl. .......................... 711/115; 711/103

(58) Field of Classification Search .................. None
See application file for complete search history.

(56) References Cited

U.S. PATENT DOCUMENTS

| | | | |
|---|---|---|---|
| 5,533,124 A | 7/1996 | Smith et al. ...................... 380/4 |
| 5,666,320 A | 9/1997 | Wong et al. | |
| 5,778,384 A * | 7/1998 | Provino et al. ............ 707/999.2 |
| 5,835,732 A | 11/1998 | Kikinis et al. ................. 395/281 |
| 6,101,534 A | 8/2000 | Rothschild ..................... 709/217 |
| 6,434,648 B1 | 8/2002 | Assour et al. | |
| 6,487,597 B1 | 11/2002 | Horie et al. .................... 709/227 |
| 6,516,416 B2 | 2/2003 | Gregg et al. ................... 713/201 |
| 6,522,534 B1 | 2/2003 | Wu .................................. 361/686 |
| 6,688,973 B2 | 2/2004 | Satloff et al. ....................... 463/1 |
| 6,697,944 B1 | 2/2004 | Jones et al. .................... 713/168 |
| 6,704,824 B1 | 3/2004 | Goodman ...................... 710/300 |
| 6,716,102 B2 * | 4/2004 | Whitten et al. .................. 463/43 |
| 6,733,329 B2 | 5/2004 | Yang .............................. 439/518 |
| 6,748,541 B1 | 6/2004 | Margalit et al. .............. 713/201 |
| 6,799,226 B1 * | 9/2004 | Robbin et al. ................... 710/15 |
| 6,880,054 B2 | 4/2005 | Cheng et al. .................. 711/164 |

(Continued)

FOREIGN PATENT DOCUMENTS

EP 1 239 379 A2 11/2002

(Continued)

OTHER PUBLICATIONS

Notice of Allowance dated Dec. 4, 2009, U.S. Appl. No. 11/709,593, filed Feb. 21, 2007, Dan Klitsner.

(Continued)

*Primary Examiner* — Than Nguyen
(74) *Attorney, Agent, or Firm* — Haverstock & Owens LLP

(57) ABSTRACT

In an embodiment of the invention, a dongle is configured for communication with an electronic device. The dongle includes a connector, a controller, a first memory and a second memory. The connector is for interfacing with the electronic device. The controller is for controlling the interface between the connector and the electronic device. The first memory includes a file system. The controller is configured to provide automatic recognition of the dongle and mounting of the file system to the electronic device by using the connector when the dongle interfaces with the electronic device. The second memory has data for automatic navigation to a predetermined location. The dongle is configured for automatic execution of an element of the file system.

34 Claims, 12 Drawing Sheets

U.S. PATENT DOCUMENTS

| | | | |
|---|---|---|---|
| 6,898,653 B2 | 5/2005 | Su et al. | 710/302 |
| 6,920,500 B2 | 7/2005 | Surloff et al. | 709/227 |
| 6,947,332 B2 | 9/2005 | Wallace et al. | |
| 6,959,362 B2 | 10/2005 | Wall et al. | 711/130 |
| 6,959,860 B2 | 11/2005 | Hendrick | 235/380 |
| 6,986,030 B2 | 1/2006 | Shmueli et al. | 713/1 |
| 7,106,609 B2 | 9/2006 | Wallace et al. | |
| 7,366,551 B1 | 4/2008 | Hartley | |
| 7,370,166 B1 | 5/2008 | Ramesh et al. | |
| 7,676,584 B2 | 3/2010 | Klitsner et al. | |
| 2002/0023010 A1* | 2/2002 | Rittmaster et al. | 705/26 |
| 2002/0095501 A1 | 7/2002 | Chiloyan et al. | 709/227 |
| 2002/0108052 A1 | 8/2002 | Maruyama | |
| 2003/0177347 A1 | 9/2003 | Schneier et al. | |
| 2004/0073787 A1 | 4/2004 | Ban et al. | 713/159 |
| 2004/0127254 A1* | 7/2004 | Chang | 455/557 |
| 2005/0042930 A1 | 2/2005 | Harkabi et al. | 439/660 |
| 2005/0109841 A1* | 5/2005 | Ryan et al. | 235/380 |
| 2005/0114300 A1 | 5/2005 | Khalid et al. | |
| 2005/0114643 A1 | 5/2005 | Bryant-Rich et al. | 713/1 |
| 2006/0031752 A1 | 2/2006 | Surloff et al. | 715/501.1 |
| 2006/0107317 A1 | 5/2006 | Moran et al. | 726/21 |
| 2006/0205515 A1 | 9/2006 | Cockerille et al. | 463/43 |
| 2006/0208066 A1* | 9/2006 | Finn et al. | 235/380 |
| 2006/0217996 A1 | 9/2006 | Graves | 705/1 |
| 2006/0287110 A1 | 12/2006 | Klitsner et al. | 463/44 |
| 2007/0117616 A1* | 5/2007 | Bartholomew | 463/29 |
| 2008/0123669 A1 | 5/2008 | Oliveti et al. | |

FOREIGN PATENT DOCUMENTS

| | | |
|---|---|---|
| WO | WO 02/093468 A1 | 11/2002 |
| WO | 2005/029279 A2 | 3/2005 |

OTHER PUBLICATIONS

Supplementary European Search Report dated May 20, 2010, European Application No. 06 77 0100.3, Kid Group LLC.

Chinese Office Action dated Jun. 2, 2010, Chinese Patent Application No. 200680026106, Kid Group LLC.

\* cited by examiner

METHOD AND APPARATUS FOR PROVIDING GAMES AND CONTENT

RELATED APPLICATIONS

This application claims priority under 35 U.S.C. §119(e) of U.S. Provisional Patent Application No. 60/682,183, filed May 17, 2005, and entitled "PC PLUG N PLAY," which is hereby incorporated by reference.

FIELD OF THE INVENTION

The present invention relates to the field of electronic games and content. More particularly, the present invention relates to method and apparatus for providing games and content.

BACKGROUND

A new area of electronic games is the television plug and play product. These are games contained in a single-use handheld controller that a user simply plugs into a TV to play. $550 million was spent on television plug and play products in 2005 through retail purchases.

Online activities have increase over the past several years. These online activities requiring only a computer and an internet connection, include online gaming, communities, trading, downloading media and subscription activities. The gaming portion alone is a large portion of the revenue generated by companies that foster these activities.

However, to participate in an online activity associated with network games, or with online community content in general, a player must typically connect their PC to the online network and provide some very personal and/or financial information. This has created barriers for those consumers who are either (1) technically challenged or techno phobic such that finding and navigating the desired content is sufficiently discouraging of participation, or (2) are concerned about privacy and unwilling to enter personal identifying and/or financial information. Some online access requirements are quite invasive and require name, address, telephone number(s), email address(es), and/or credit card information.

What is needed is a simple, secure and inexpensive means from a retail store to connect with the online experience.

SUMMARY OF THE INVENTION

In an embodiment of the invention, an apparatus is configured for communication with an electronic device. The apparatus will be referred to hereinafter as a so called "dongle." The dongle includes a connector, a controller, a first memory and a second memory. The connector is for interfacing with the electronic device. The controller is for controlling the interface between the connector and the electronic device. The first memory includes a file system. The controller is configured to provide automatic recognition of the dongle and mounting of the file system to the electronic device by using the connector when the dongle interfaces with the electronic device. The second memory has data for automatic navigation to a predetermined location. The dongle is configured for automatic execution of an element of the file system.

Preferably, the contents of the second memory are hidden from an operating system of the electronic device such that the contents are only accessible through the controller. The controller of some embodiments permits a write operation to one or more of the memories of the dongle, while the controller of some embodiments denies a write operation to one or more of the memories. The data in the second memory often comprises a link to a remote location. Preferably, the second memory further includes a security code for automated authentication of the dongle. The dongle of these embodiments provides authorization for accessing secured information by using a unique identifier.

The dongle is often configured to emulate a compact disc such that the dongle is mounted as a compact disc on the electronic device. In these embodiments, the electronic device includes an operating system that is configured for autorun capability. The first memory of these embodiments typically contains an information file that specifies the element of the file system for automatic execution.

In some embodiments, the connector is a universal serial bus (USB) type connector, the first memory comprises read only memory (ROM), and the second memory comprises random access memory (RAM). The electronic device is typically a personal computer, a server, a personal digital assistant, a cellular telephone, or a game station.

Some embodiments of the invention provide a method of interfacing with an electronic device. The method couples to the electronic device by using a connector and controls the interface between the connector and the electronic device. The method retrieves from a first memory a stored file system and provides the retrieved file system to the electronic device by using the connector. The method automatically recognizes the file system when the connector interfaces with the electronic device, automatically executes an element of the file system, and uses data from a second memory. The contents of the second memory are often hidden from an operating system of the electronic device such that the contents are only accessible through the step of controlling the interface between the connector and the electronic device. The data typically comprises a link to a remote location. The second memory of some of these embodiments further includes a security code for automated authentication. The method optionally further provides authorization for accessing secured information, often, by using a unique identifier. In another embodiment of the invention, the second memory can be a micro controller.

In an additional embodiment of the invention, a system for providing content includes an electronic device for receiving the content. The system has a source location that has a unique address and that contains the content. The system also has a security code for authenticating access to the source location and a dongle that stores the security code. The dongle is configured to provide the security code to the source location when the dongle is coupled to the electronic device such that the source location provides the content to the electronic device. In some embodiments, the dongle is mounted by an operating system of the electronic device as a writeable removable storage medium, while some embodiments mount the dongle as a read only removable storage medium. In a particular embodiment of the invention, the dongle is mounted on an operating system of the electronic device as a compact disc (CD) type removable storage medium only. In another embodiment of the invention, the dongle is mounted on an operating system of the electronic device as a fixed disk drive.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

I. Introduction and Apparatus

In contrast to the online games and the methods by which consumers join and participate in online activities such as the online communities described above, embodiments of the invention provide a method and means for accessing content, particularly related to an online community, without the need for sophisticated navigation and/or without requiring personal and financial data. Accordingly, some embodiments provide for content distribution, such as game distribution, in an alternative hardware/software format. For example, some of these embodiments include a physical means that is purchased anonymously just as any retail item and, further, that plugs directly into a personal computer or other suitable electronic device to provide navigation and/or access. A particular embodiment accomplishes the features described above through a dongle that provides the automatic navigation, execution, and/or secure access capabilities.

Figure 1:
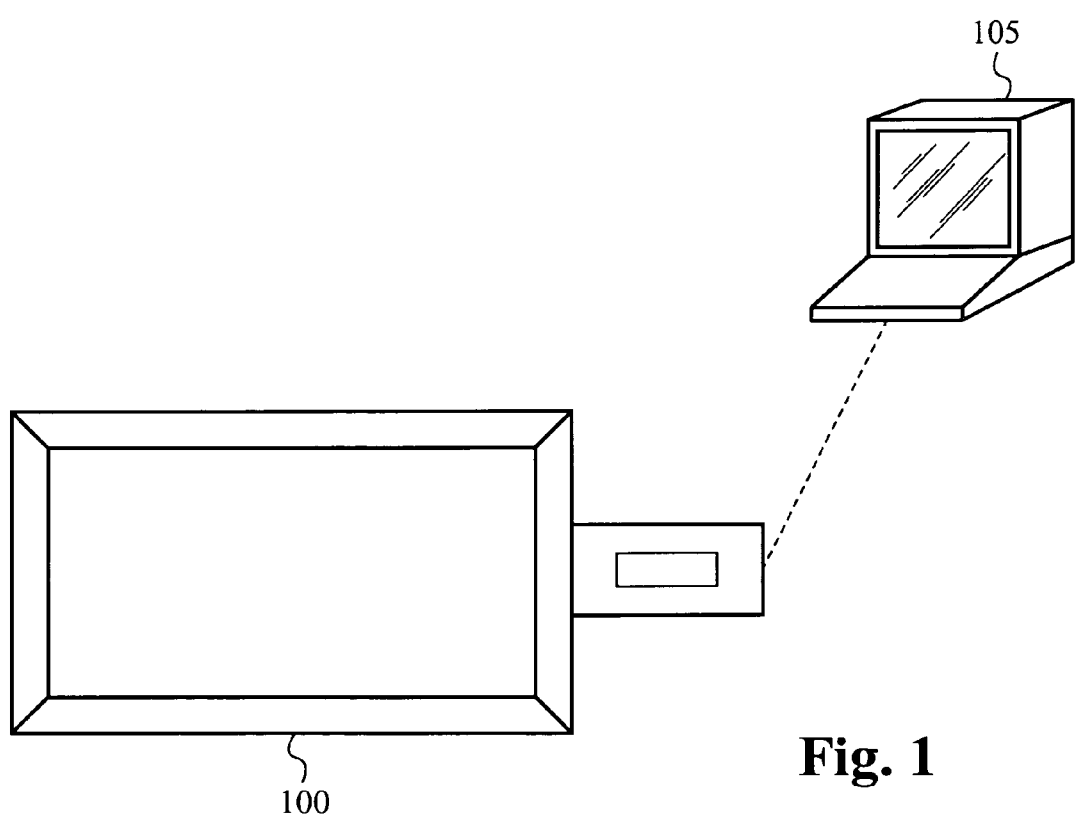
FIG. 1 illustrates a dongle that is connected with an electronic device according to some embodiments of the invention.

For instance, FIG. 1 illustrates an apparatus or "dongle" 100 that is coupled with an electronic device 105 according to some embodiments of the invention. As shown in this figure, the electronic device 105 is typically a personal computer that is configured with a port for coupling the dongle 100. The dongle typically couples through the USB port of a personal computer. However, one of ordinary skill will recognize the other forms of coupling such as USB2.0, Firewire, iLINK, or any number of other direct contact, wired, and/or wireless means of connectivity. The embodiment illustrated in FIG. 1 provides for the automated navigation and/or authentication for access to content that is stored locally on the dongle 100 and/or the electronic device 105. Alternatively, or in conjunction with the embodiment illustrated in FIG. 1, some embodiments provide for joining and participating in online or networked activities. An example of these embodiments is illustrated in FIG. 2.

Figure 2:
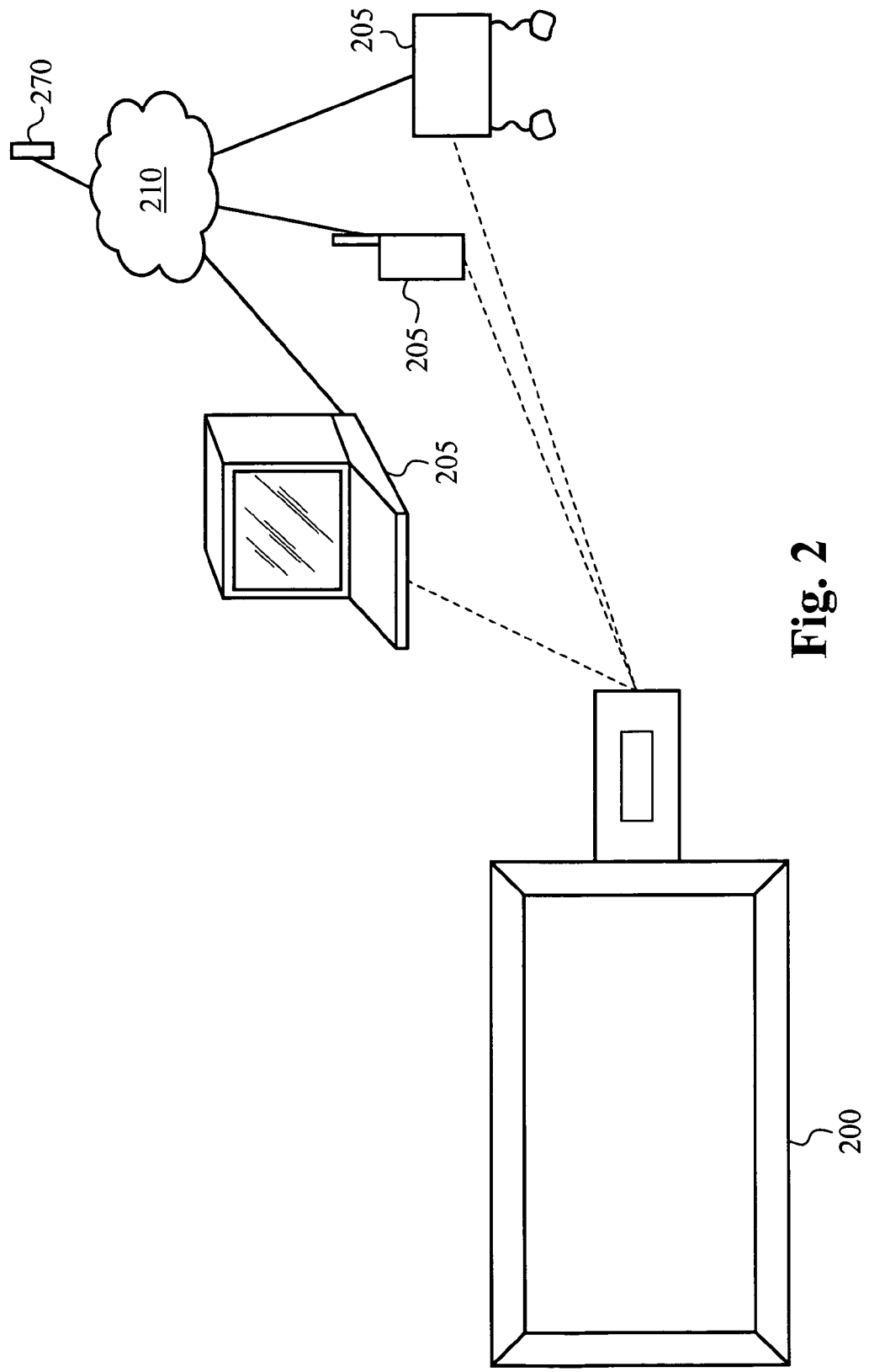
FIG. 2 illustrates a dongle that connects with any number of networked devices in accordance with some embodiments of the invention.

As shown in FIG. 2, the dongle 200 additionally couples with any number of network devices 205 that are connected to a network 210. Examples of the networked devices 205 include, but are not limited to, personal computers, laptop or notebook computers, servers, personal digital assistants, game consoles or stations, and cellular telephones. The network 210 includes a local area network (LAN), a wide area network (WAN), a virtual private network (VPN), an intranet, and extranet, and/or a network of networks such as the Internet, for example. The network 210 includes one or more content sources that are typically in the form of a remote server 270.

The dongle of some embodiments emulates a removable storage drive when connected to the electronic device, such as, for example the CD-ROM drive on a personal computer. In some instances, the electronic device configures operating system support for the dongle as both a compact disc (CD) and as another type of removable storage drive. In a particular embodiment, an operating system running on the electronic device recognizes the dongle as only a CD type medium. In these embodiments, the dongle is typically coupled to the personal computer through a USB port. However, as mentioned above, one of ordinary skill will recognize other forms of connection. For the sake of clarity, an exemplary USB type dongle will be described in further detail below.

Figure 3:
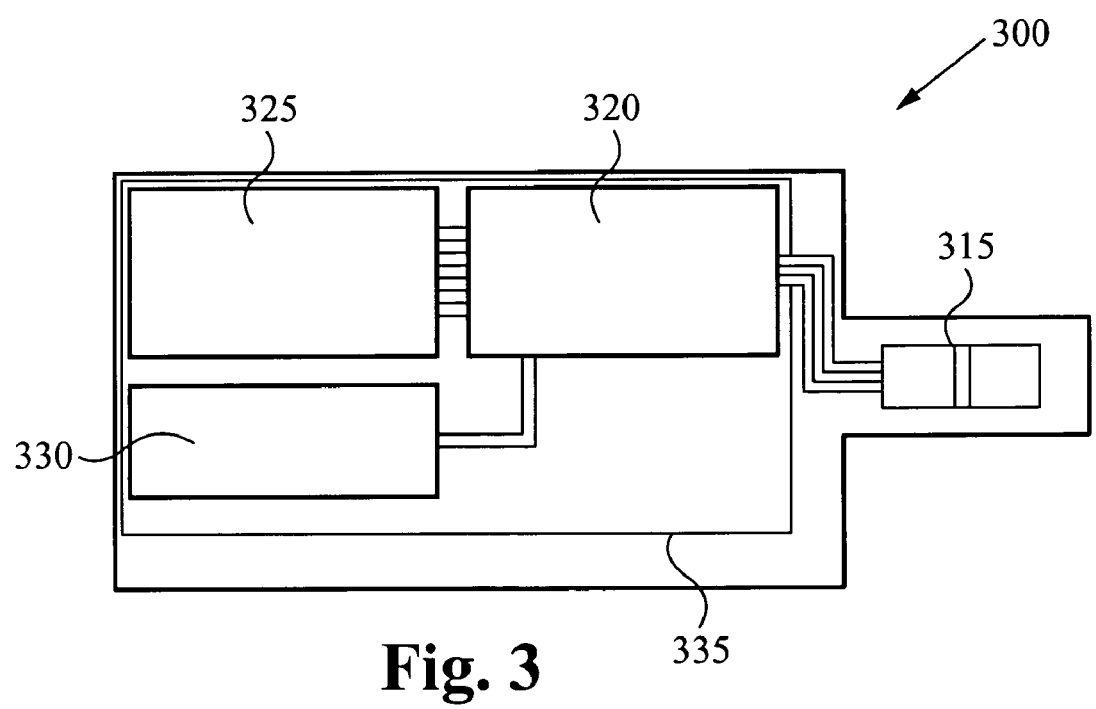
FIG. 3 illustrates the dongle of some embodiments in greater detail.

Specifically, FIG. 3 illustrates the dongle of some embodiments in greater detail. As shown in this figure, the dongle 300 includes a connector 315, a controller 320, and two memories 325 and 330, that are interconnected. As mentioned above, the connector 315 is configured for connectivity to any number of ports for electronic devices such as the USB connector illustrated in this embodiment.

The controller 320 controls data transmission between the connector 315 and the other components of the dongle 300 such as the memories 325 and 330. The controller is typically specifically suited to control the particular functions of the type of connector 315, such as setup and/or configuration of the connection, mounting, and/or data transmission with the connected electronic device.

The first memory 325, typically stores a file system in a non volatile fashion. For instance, the memory 325 of some embodiments is a read only memory (ROM) that stores a Windows® compatible file system such as ISO CD Format, CDFS or the file allocation table (FAT®) file system. Both Windows and FAT are provided by the Microsoft corporation. The ROM can be implemented as a mask programmable ROM, a programmable ROM (PROM), an erasable PROM (EPROM), an electrically erasable EPROM (EEPROM) or a flash memory. For simplicity of discussion, all these types of devices will hereafter be described only as ROMs. However, additional storage means and file systems are recognized by those of ordinary skill and are contemplated in alternative embodiments. Thus, the first memory 325 (the ROM) typically contains a file system that is readable by the electronic device. The file system of these embodiments typically further contains additional elements that provide for the automatic recognition of the file system and/or the dongle. Additionally, some embodiments provide for the automatic execution of certain scripts, applications, and/or programs that are stored in the memories 325 and 330 of the dongle.

For instance, the ROM of some embodiments further includes three small files: an information file autorun.inf, a startup application, and an icon file. The information file autorun.inf of these embodiments typically specifies the startup application and the icon to be used on the desktop of the host operating system. The icon file is used to display predetermined iconic information when the dongle is connected to the electronic device. Specifically, the icon file of some embodiments contains a bit map image of the icon for display when the device is mounted on the desktop of an electronic device running a Windows type operating system.

Similarly, the autorun.inf file and startup application are used to automatically perform a predetermined task or program upon connection of the dongle. The startup application typically first confirms the presence of a connection, and then automatically executes a desired function, which often includes obtaining additional information from the second memory 330. Mounting and the autorun.inf file are discussed further in Section II, while an exemplary startup application is described in Section III.

The autorun.inf and icon file are often very small, on the order of less than 1 KB, for example. The startup application is locally stored or contains a function call to an externally stored application. Whether locally stored or merely containing a call to an externally stored procedure, the startup application is often smaller than 256 KB. For a typical 512 KB ROM chip, about 256 KB remain for use by the controller 320 and components of the dongle to emulate a traditional mass storage device containing the three small files (autorun.inf, icon, startup application). For instance, the dongle of some embodiments emulates a CD (including CD-ROM, CD-R, CD-RW, and other read, read only, and read/write formats) when connected to an electronic device that supports such media, such as a personal computer. The emulation of a traditional mass storage device in the form of a CD has particular advantages for automatic mounting of the dongle and the execution of data, including executable data, stored on the connected electronic device. These advantages will be described further in Section II.

Also, the first memory of some embodiments is masked such that certain implementation details of the first memory and/or dongle are hidden from the user and operating system of the electronic device. These embodiments typically further do not allow writing of data to the first memory. However, some embodiments specifically allow writing of particular data to the first memory. These embodiments allow a user, operating system, and/or application of the electronic device to particularly save a state or other information. For instance, during the execution of a game, a user advantageously saves the state of the game being played to the first memory. Some embodiments perform the save state function by using the controller to access and write to the file system of the first memory. As needed, some embodiments similarly hide or reveal details regarding the second memory 330, and/or permit or deny read and/or write operations to the second memory 330.

The second memory 330 illustrated in FIG. 3 is typically a non-volatile random access type memory (RAM) such as an EEPROM. Data are often written to the second memory (RAM) at the time of manufacture for use by the automatic recognition and execution operations described above. For instance, when the autorun and startup information includes commands for opening a web browser and navigation to a specific address, the RAM typically includes a universal resource locater (URL) address for use by the web browser. However, other types of addressing, such as local directory and/or memory addressing, for example, and other uses for data storage are recognized by one of ordinary skill. For instance, the RAM of some embodiments further includes a security code. The security code of these embodiments provides automated authorization for secured content and/or access to network services. Hence, a user of such a security code is freed from the burden of providing any personal or financial information, other than the security code, and remains relatively anonymous during the login/and or authentication process. Additionally, these users easily transfer the secure online or network identity from one electronic device to another.

Further, when coupled with the automatic execution and addressing features, the user is freed from the burden of navigation, configuration, and/or execution as well. For the case of joining an online community or game forum, the process is reduced to a true plug-and-play operation. Typically, the data stored in the second memory (the RAM) is not available to a user through a conventional file system on the electronic device, but is hidden from the user and operating system of the electronic device.

Preferably, a startup application stored in the first memory (the ROM) that is loaded and/or executed on the electronic device is enabled to access the second memory by using non-standard features that are customized for the controller 320. In some embodiments, other data are configured for the first and second memories at the time of manufacture and/or at various other times. Certain types of memories particularly lend themselves to uses involving periodic writing and re-writing of data. For instance, electronically erasable programmable ROM (EEPROM), field programmable gate arrays (FPGAs), and flash RAM, are a few types of memories that particularly lend themselves to periodic updating.

In the particular exemplary implementation of the dongle 300 illustrated in FIG. 3, the connector 315 is a standard USB "A" type connector, the controller 320 is a custom USB controller provided by Sonix, Inc., the first memory 325 is a 4 Mbit masked ROM, and the second memory 330 is a 2 Kbit serial flash RAM, all coupled to a conventional printed circuit board (PCB) 335. The details of an exemplary wiring for the PCB 335 are further illustrated below.

Figure 4:
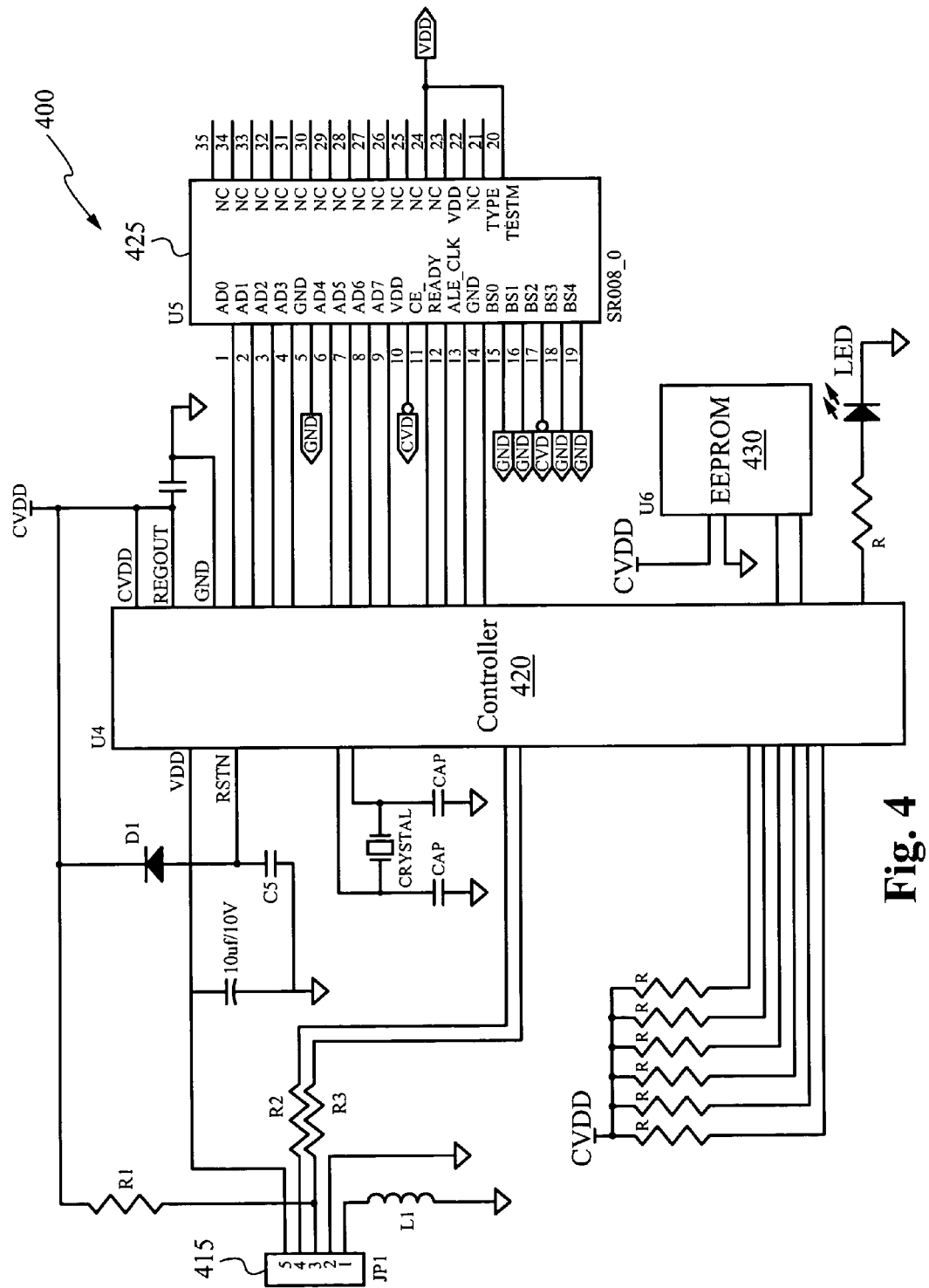
FIG. 4 illustrates a wiring diagram for an exemplary dongle.

FIG. 4 illustrates a wiring diagram for an exemplary dongle 400 in accordance with some embodiments. As shown in this figure, the dongle 400 includes a controller 420 coupled to a connector 415, a ROM 425, and an EEPROM 430. The controller 420 provides a communications interface between the connector 415, the ROM 425, and the EEPROM 430. The controller 420 further provides a communications interface with a driver on the electronic device (not shown) through the connector 415. Typically, the electronic device requests information from the controller 420. Then, the controller 420 typically provides data from the memories (ROM 425 and/or EEPROM 430) to the electronic device through the connector 415. Further, in some embodiments, the EEPROM 430 is not directly viewable by an operating system of the electronic device, and is only accessible through the controller 420. The controller 420 of these embodiments is not a conventional controller and performs a non-standard communication access of the EEPROM 430 to secure the information from the operating system and/or the user of the electronic device. Thus, information within the EEPROM 430, such as addresses, identification, and security codes, are hidden from unauthorized access.

The dongle 400 of some of these embodiments is provided by KID Interactive, LLC under the trade name PNP LIVE®.

In particular, the USB implementation of some embodiments is provided in conjunction with Wizardtronics, Ltd. of Amesbury, Mass.

II. Operation

Preferably, the dongle 400 is connected to an electronic device by using a connector 415 coupled to the controller 420 through the PCB. The electronic device typically provides a power signal to the controller 420 through the connector 415. The power signal is typically generated when the connector for the dongle 400 is inserted into the appropriate port on the electronic device, such as an available USB port, for example. Upon receiving the power signal, the controller 420 typically accesses the data stored in the first memory, for example, the ROM 425. As mentioned above, the stored data typically contains information for automatic execution of a program. For instance, the ROM 425 of some embodiments contains data that launch a default browser application with a specific URL when the dongle 400 is plugged into a USB port. Continuing with the example, parameters for the launched application are retrieved from the second memory such as the flash RAM or EEPROM 430. The parameters of some embodiments include the URL and a security code for accessing secured content at the URL. In some embodiments, the configuration details are masked from the operating system such that the ROM 425 emulates a particular device such as removable storage or a CD-ROM device. Similarly, some embodiments hide the parameters from the user such that the details of navigation and/or security access are transparent.

The browser application specified by the automatic execution information is either locally or remotely stored. Alternatively, in some embodiments the automatic execution files first look for a specific application in the operating system registry and, if available, launch that application with one or more parameters, such as the security code. Certain operating systems are particularly enabled for the features of the embodiments described above.

Figure 5:
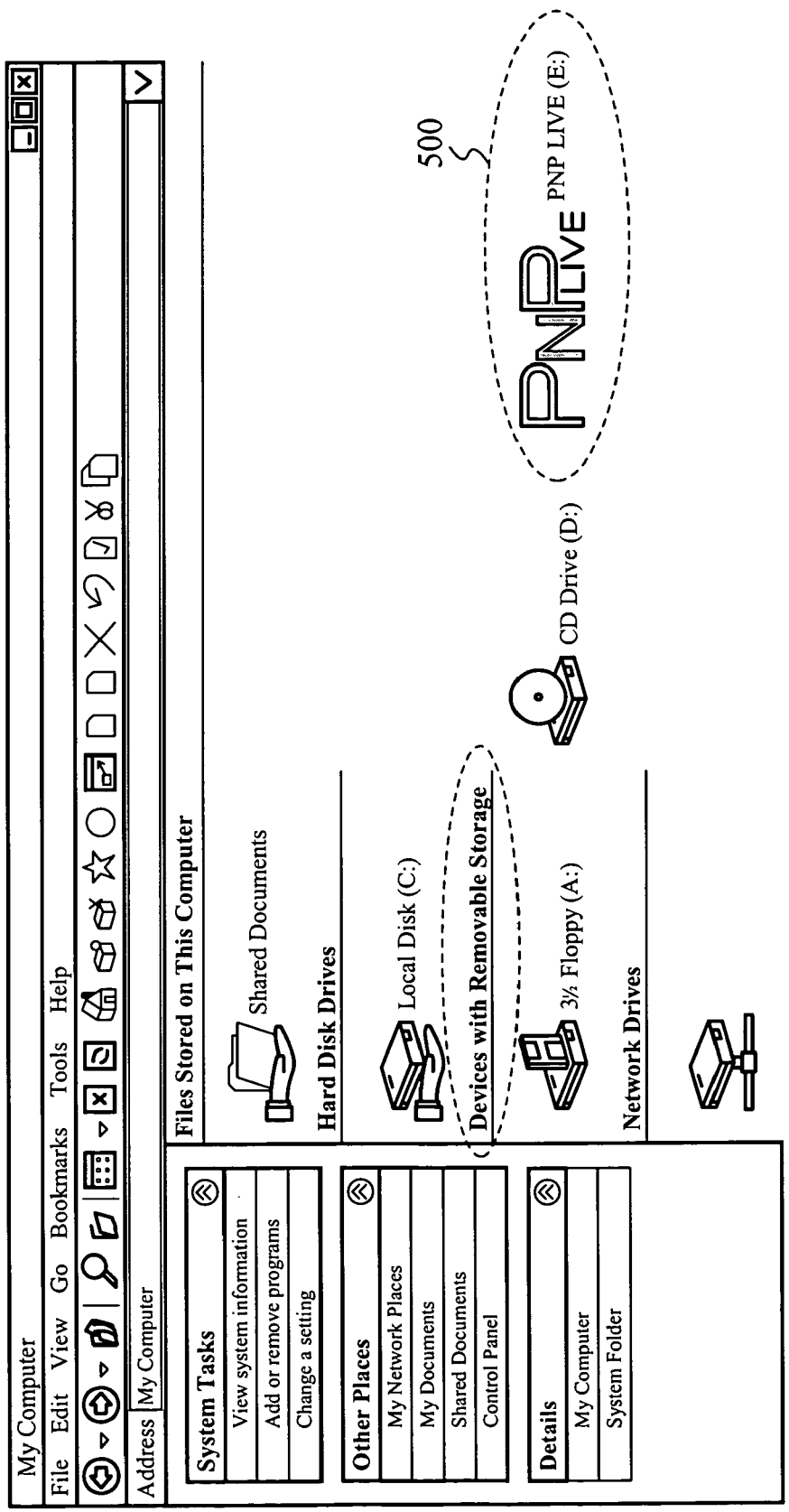
FIG. 5 illustrates a graphical user interface of an operating system in which the dongle of some embodiments is mounted.

For instance, FIG. 5 illustrates a graphical user interface (GUI) of an operating system in which the dongle 500 of some embodiments is mounted. As shown in this figure, the dongle 500 has been mounted in the GUI of the operating system as a device with removable storage entitled "PNP LIVE." Specifically the operating system has recognized the dongle as a CD and assigned the drive letter "E:" to the dongle 500 emulating a PNP LIVE CD. A dongle will be referred to as mounted when it has been connected to an electronic device and an operating system running on the electronic device recognizes a file system stored on the dongle. The operating system then typically "mounts" the recognized file system.

The exemplary operating system illustrated in the GUI of FIG. 5 is "autorun" compatible. As is known in the art, when particular media are inserted in an electronic device that is autorun enabled, that is, running an operating system that is autorun capable, such as a compact disc (CD) into a CD-ROM drive, some operating systems immediately check to see if the disc has a recognized file system. Some operating systems further check whether the file system supports automatic execution of files and or programs. If the CD has a file system configured for automatic execution, then the operating system searches for an information file that specifies a further action. As mentioned above, the file of some systems is named autorun.inf. The autorun.inf file specifies a startup application for automatic execution, along with a variety of optional settings. The startup application of some embodiments further launches one or more additional application(s).

A. Details of AUTORUN Information Files

An exemplary autorun.inf file will be further described below in relation to the Microsoft Windows operating system and a mounted device that emulates a CD-ROM device. As mentioned above, the autorun.inf file typically references another file such as a startup application. The startup application typically installs, uninstalls, configures, and/or runs a desired application. The autorun.inf file is typically a text file located in the root directory of the removable storage that contains the desire application for automatic execution. The primary function of the autorun.inf file is to provide the system with the name and location of the application for automatic execution. The autorun.inf file also often contains optional information including: (1) the name of an icon file for displaying, by the operating system, an icon in place of the standard drive icon; and (2) additional commands for the shortcut menu that is displayed when the user right-clicks the icon in the operating system's GUI. Here, some embodiments also specify the default command that is run when the user double-clicks the icon.

The autorun.inf file is similar to ".ini" files, in that both include one or more sections. Each section is headed by a name enclosed in square brackets and contains a series of commands that will be run by the operating system when the removable media, such as the dongle, is connected and/or inserted. As is known in the art, the typical operating system executes the commands in a shell. There are two sections that are currently defined for autorun.inf files: (1) The [AutoRun] section, which contains the default autorun commands. All autorun.inf files must have an [AutoRun] section; and (2) An optional [AutoRun.alpha] section, which is included for Microsoft Windows NT 4.0 systems running on RISC-based computers. When the dongle is mounted on a RISC-based system, the shell will run the commands in this section instead of those in the [AutoRun] section.

B. The [AutoRun] Section

The shell checks for an architecture-specific section first. If no architecture specific section is found, the shell uses the information in the [AutoRun] section. After the shell finds a section, it ignores all others, so each section must be self-contained. Each section contains a series of commands that determine how the autorun operation takes place. (There are five commands available.) The following is an example of a simple autorun.inf file that specifies Filename.exe as the startup application. The second line that references icon=Filename.exe,1 uses the image stored in the icon file to represent the file Filename.exe, instead of the standard drive icon.

```
[AutoRun]
open=Filename.exe
icon=Filename.exe,1
```

The sample autorun.inf file below illustrates an alternate version of the file illustrated above that additionally runs different startup applications depending on the type of computer, in this case x86 or alpha.

```
[AutoRun]
open=Filename_x86.exe
icon=IconFile.ico
[AutoRun.alpha]
open=Filename_RISC.exe
icon=IconFile.ico
```

C. The [DeviceInstall] Section

The [DeviceInstall] section is for any removable media such as CD media, and such as the dongle which emulates removable CD media, as described above. This section is currently supported only under Windows XP® and has one associated command, "DriverPath," to specify a directory path where Windows XP searches for driver files, which prevents a lengthy search through the entire contents of the removable storage media. The [DeviceInstall] section is often used with a driver installation to specify directories where Windows XP should search the media for driver files. Under Windows XP, entire media are no longer searched by default, therefore the Windows XP operating system (shell) requires [DeviceInstall] to specify search locations. However, Windows XP currently searches the following without a [DeviceInstall] section in an autorun.inf file: Floppy disks found in drives A or B, and CD/DVD media less that 1 gigabyte (GB) in size. All other media must include a [DeviceInstall] section for Windows XP to detect any drivers stored on that media. Hence, the small file system size coupled with the CD media emulation capability of some embodiments has particular advantages with this type of operating system. As with the [AutoRun] section, the [DeviceInstall] section is often architecture-specific.

D. The Startup Application

There are few constraints on the autorun startup application. The startup application of various embodiments implements whatever operation(s) are desired or necessary to install, uninstall, configure, or run an application. However, the startup application preferably provides some feedback to a user who connects the dongle into an electronic device. It is also preferred that startup applications are small programs that load quickly, for instance GUI functions that clearly identify the operation undergoing automatic execution, and optionally a means to cancel the operation. In an additional embodiment, the startup application presents the user with a user interface, such as a dialog box, presenting options on how to proceed. If a program is selected for execution, these embodiments then check to see if the program is already installed. If not, a setup procedure is performed. Preferably the startup application utilizes the time the user spends viewing the dialog box by initiating another thread to begin loading setup code or connecting to a remote location, for example. This approach significantly reduces the user's perception of any automatically executed process.

If the relevant application(s) have already been installed, the user likely connected the dongle with the intention of accessing media or running the installed application(s). As with the setup case, some embodiments start a thread to begin loading application code to shorten the wait time perceived by the user. Storage space is often a limited resource on the connected electronic device and/or the dongle. Accordingly some embodiments minimize hard disk usage by keeping the number of files that must be stored to a minimum. As data become essential to running the program or for content access by the user, the needed data are retrieved and/or presented by using the navigational and/or authentication properties of the dongle.

Similarly, these embodiments provide an additional level of portability and privacy for the user, as the navigational and authentication means are safely removed from one electronic device and easily transferred to another electronic device by using the dongle. Some embodiments provide additional measures to uninstall any components that were temporarily placed on the local electronic device and/or remote network site(s). Moreover, even though the removable storage has an autorun.inf file, the autorun capability is suppressed in some embodiments programmatically or disabled entirely with the operating system registry. Further details regarding the Microsoft implementation of the autorun.inf file are available at: <http://msdn.microsoft.com/library/default.asp?url=/library/en-us/shellcc/platform/shell/ programmersguide/shell_ basics/shell_basics_extending/autorun/autoplay_works.asp>.

III. Example Implementations

A. Yu-Gi-Oh! Online and Local Game Applications

Figure 6:
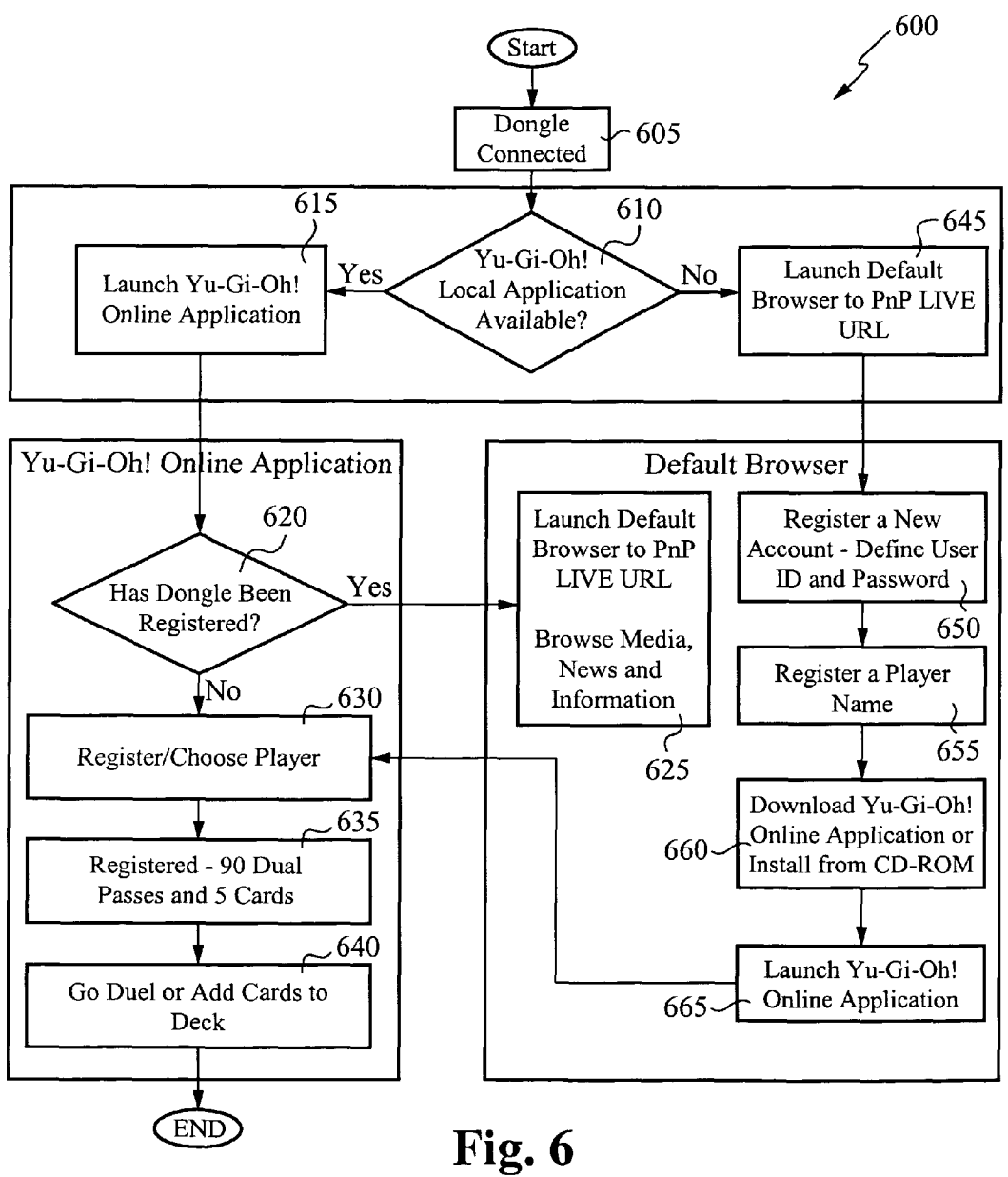
FIG. 6 illustrates a process for the automatic execution of an application triggered by some embodiments.

Once automatic execution is triggered and underway as described above, a number of processes, operations, procedures, and the like, are spawned, executed, and/or performed in various embodiments. For instance, FIG. 6 illustrates a process 600 for the automatic execution of a game application Yu-Gi-Oh! triggered by some embodiments.

As shown in this figure, the process 600 begins at the step 605, where the dongle of the embodiments described above is connected with an electronic device. Then the process 600 transitions to the step 610, where it is determined whether Yu-Gi-Oh! application is available locally. If the application is available locally, the process 600 transitions to the step 615, where an automatic execution script begins launching the Yu-Gi-Oh! application locally before the process 600 transitions to the step 620 to launch the online application. As described above, the information and commands necessary for navigating and connecting to the online application are typically stored locally in the memory of the dongle.

Figure 6A:
FIG. 6A illustrates a GUI for the Yu-Gi-Oh! online application.

At the step 620, it is determined whether the dongle is properly registered. For instance, some embodiments compare authentication information such as the security code stored by the dongle to an online list. For the embodiment illustrated in FIG. 6, the security code is used to determine what cards are available and to whom the cards, security code, and/or dongle belong. If at the step 620, the dongle is registered, then the process 600 transitions to the step 625, where the user of the dongle is granted online access to a panoply of online media, news, information, and services. For instance, some embodiments launch an application such as a default browser on the user's electronic device. Some of these embodiments further jump to a predetermined local or network location such as the PnP Live site provided by KID Interactive, LLC. At the automatically addressed and linked location, the user selects from a number of games and services for which authorization is provided such as the Yu-Gi-Oh! online game. As mentioned above, the location is typically provided by the dongle's onboard memory storage. FIG. 6A illustrates an exemplary GUI for an Yu-Gi-Oh! online application that was linked for automatic navigation and/or authentication, in accordance with some embodiments.

If at the step 620, the dongle has not been properly registered, then the process 600 transitions to the step 630, where an opportunity is provided to register the dongle and/or a new user. Once registration occurs, some embodiments provide additional opportunities at the step 630. For instance, the game embodiments such as the illustrated Yu-Gi-Oh! online game example, allow the newly registered dongle/user to choose a player or character from a library of game characters. Then, the process 600 transitions to the step 635.

Figure 6B:
FIG. 6B illustrates a card trading feature available in some embodiments.

At the step 635, the newly registered dongle and/or user is granted an allotment of attributes for participation in the Yu-Gi-Oh! online game. For instance, some embodiments provide 90 duel passes and five playing cards to the user of the newly registered dongle. Then, the process 600 transitions to the step 640, where the game play begins. In the Yu-Gi-Oh! embodiment illustrated in FIG. 6, players typically go to a specific area of the online community environment to duel each other by using selected game characters, or to add character and/or playing cards to their decks by trading or by other means. FIG. 6B illustrates an online location for such a card collection and/or trading activity. As shown in this figure, the character/playing cards are particularly relevant to the Yu-Gi-Oh! game application. After the step 640, the process 600 concludes.

As shown in FIG. 6, the process 600 typically checks whether the Yu-Gi-Oh! local application is installed and launches it, if available at the step 610. If, however, the local application is not available, then the process 600 transitions to the step 645, where the process 600 begins launching of an application such as a browser. The browser application is optionally stored and/or accessed locally on the dongle, on the electronic device, at a remote location, or a hybrid of these. One of ordinary skill recognizes the variations in local and remote storage and access to optimize speed and efficient use of the resources described above for the dongle and/or electronic device. For instance, some embodiments use the local browser application to hyperlink to a predetermined local or network location such as the PnP Live network site mentioned above. Also mentioned above, the URL or address for the network location is often stored in the dongle's memory.

Regardless of the speed and efficiency optimizations, once the browser begins launching at the step 645, the process 600 transitions to the step 650, where the user of the dongle is permitted to define the user's online identity and/or a password. Then the process 600 transitions to the step 655, where the user typically registers an online player or character name. Optionally, the functions and information of the steps 650 and 655 of the process 600, are provided by the dongle of some embodiments described above. For instance, some embodiments forego additional registration information by using the dongle's stored security code. These secure users add additional user profile information, at their option, when deemed appropriate or desirable.

Once authentication is complete at the step 655, the process 600 transitions to the step 660, where one or more components of the Yu-Gi-Oh! application are downloaded for local installation on the electronic device. One of ordinary skill will appreciate the additional means by which the components of the application are locally installed, such as, for example by an authenticated CD/DVD, or other suitable installation media.

Once installation is complete at the step 665, the process 600 begins launching the online portions of the application (in this case, the Yu-Gi-Oh! online application), and transitions to the step 630. Then, the process 600 proceeds as described above.

As illustrated in FIG. 6, the process 600 is conceptually divided into three areas of access and/or storage. As shown in this figure, the steps 610, 615, and 645 are typically relevant to the access of data and/or executable applications that are stored on the dongle, while the steps 625, 650, 655, 660 and 665 are typically relevant to the electronic device, such as a default browser application accessible on the electronic device. Similarly, the steps 620, 630, 635, and 640 are typically relevant to an online location, such as the Yu-Gi-Oh! online application.

One of ordinary skill will recognize variations in the process 600 illustrated in FIG. 6. For instance, as indicated above, some embodiments perform application launching and hyperlinks differently. For instance, these embodiments apply concise algorithms to more efficiently launch the Yu-Gi-Oh! local and/or online applications and check for the dongle, security code, or other identification and authentication measures. For instance, some embodiments employ smaller separate applications or applets to, for example, register the key and then launch the Yu-Gi-Oh! online application. Also, if online access is not available, the dongle of some embodiments cannot access the registration process, and thus the local application proceeds without online access, until online or network access becomes available.

B. Redline Rumble Game Application

Figure 7:
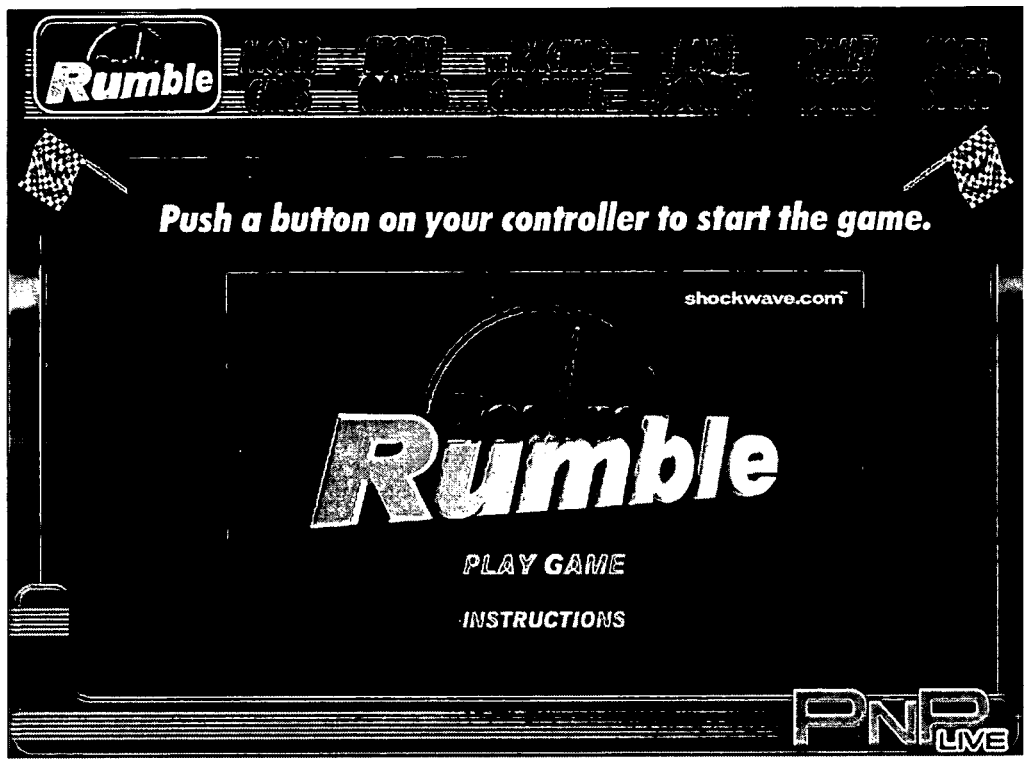
FIG. 7 illustrates a GUI and process in accordance with an embodiment of the invention.
Figure 7:
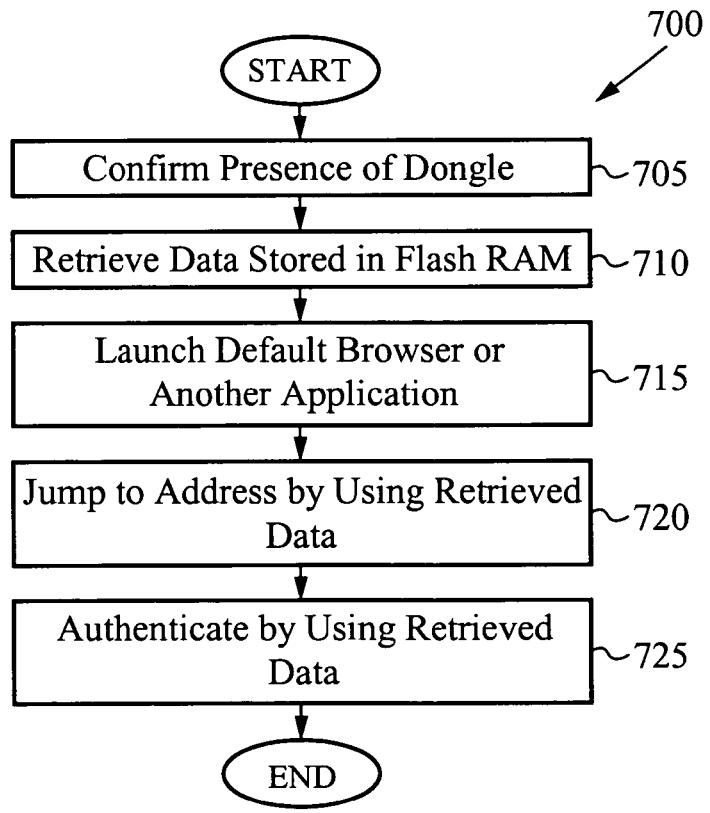

As previously mentioned, a number of games and other content are provided by various embodiments of the methods and means described above. In another instance, FIG. 7 illustrates a GUI for another game called "Redline Rumble." As shown in this figure, the Redline Rumble game application includes an authentication process 700 that begins at the step 705 by confirming the presence of a dongle in accordance with some of the embodiments described above. Then, at the step 710 the application accesses and retrieves the data stored in the memory of the dongle, for example, a Redline Rumble URL and/or security code stored in a flash RAM. Next at the step 715, the application launches a default browser or another application specified by the retrieved data. At the step 720, if the retrieved data contains an address such as a URL, the application jumps to the location specified by the retrieved data. At the step 725, the application authenticates the particular dongle by using the retrieved data. For instance, the retrieved data of some embodiments contains a security code, which permits verification for access. Once the dongle is authenticated, the process 700 concludes. At this point, the user of the dongle typically begins participating in some online activity such as playing an online network version of the application.

Alternatively, the features of the dongle are programmed to launch an existing valid application from the operating system registry, such as a local or hybrid version of the Redline Rumble application. As described above, portions of the application are stored differently in various embodiments. For instance, the dongle of some embodiments stores a startup application, while the electronic device stores a local version of the Redline Rumble application, and an online version is stored remotely at the network gaming site.

C. Additional Implementations

Figure 8:
FIG. 8 illustrates physical implementations of the dongle of some embodiments.
Figure 9:
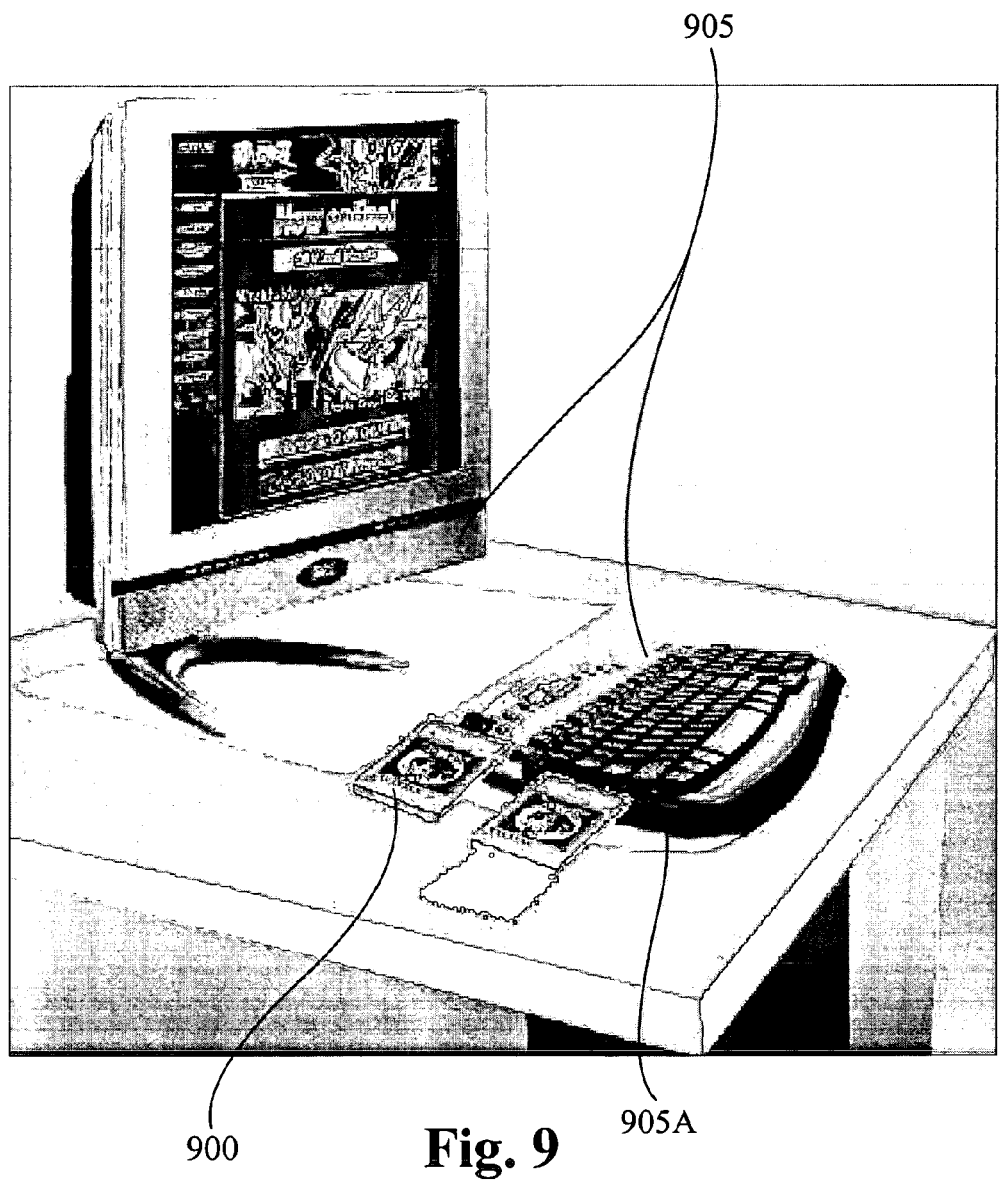
FIG. 9 illustrates the dongle of some embodiments inserted in a personal computer.

FIG. 8 illustrates that the dongle of some embodiments has particular shapes. As shown in this figure, the shapes of various embodiments have particular significance to a user. For instance, the dongles 800 illustrated in FIG. 8 have particular significance for a particular character and/or playing card that is part of the Yu-Gi-Oh! application described above. FIG. 9 illustrates the insertion of these dongles 900 into a desktop personal computer electronic device 905 in accordance with the invention. As shown in this figure, the dongles 900 are inserted into an appropriate port 905A for automatic navigation and authentication to the Yu-Gi-Oh! online application.

Figure 10:
FIG. 10 illustrates the dongle of some embodiments customized for card games.
Figure 11:
FIG. 11 illustrates that the dongle of some embodiments is customized for racing games.

FIG. 10 illustrates that the shape of some embodiments further includes additional functional features that are adapted to a particular game. For instance, as shown in this figure, the dongle 1000 is adapted for a card playing game. Specifically, as illustrated on the display of the personal computer 1005 of FIG. 10, the user of this embodiment is using the dongle in an online poker tournament. Similarly, FIG. 11 illustrates a dongle 1100 that is adapted for racing type games, including the NASCAR auto racing game illustrated in the display of the personal computer 1105 illustrated in this figure.

In another embodiment of the invention, the dongle includes facets of an electronic lifestyle that includes, for instance, an electronic pet. In a particular aspect of some of these embodiments, a user builds an electronic aquarium by purchasing dongles that contain discrete features of the aquarium, such as fish, plants, rocks, and other items found in an aquatic environment, for example. Some embodiments further allow the user to share the features of the constructed electronic lifestyle with the electronic lifestyles of other users by connection to an online network service and/or through direct connection of the dongle to one or more electronic devices. For instance, the user of a dongle having a memory that comprises an electronic fish transports the fish to "visit" another user's acquatic environment by connection of the electronic fish dongle to the electronic device that hosts the acquatic environment to be visited. Alternatively, the electronic fish "swims" from one user's aquatic environment to visit another user's aquatic environment through connection to the online services for an online community devoted to such aquatic environments and electronic pet fish.

D. Online Network

Figure 12:
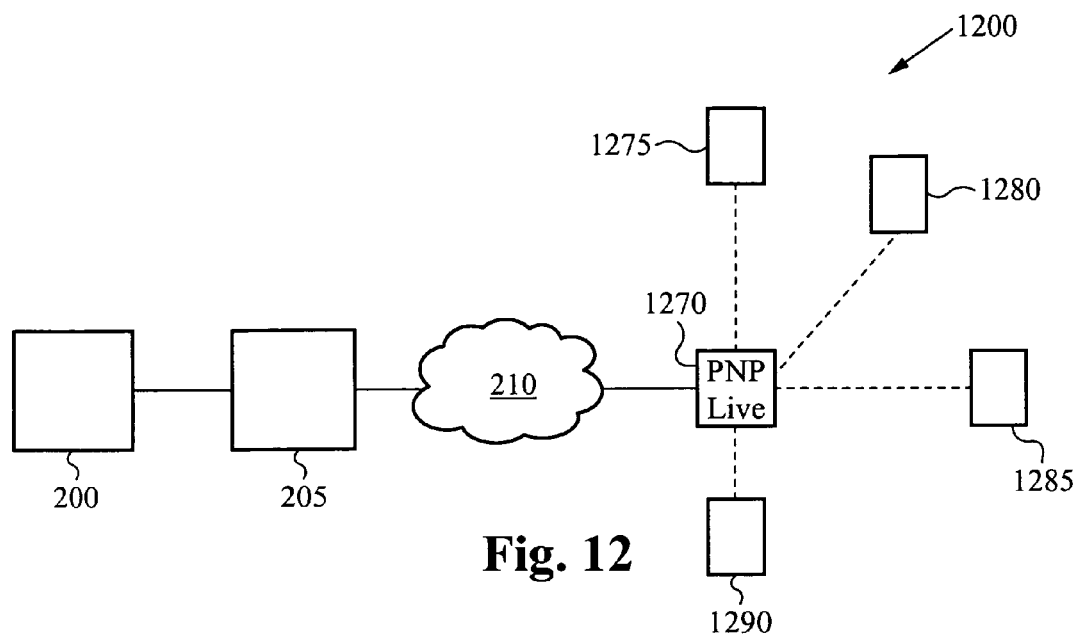
FIG. 12 illustrates the network environment of some embodiments.

The content provided by some of the embodiments described above is provided by a network environment. FIG. 12 illustrates an example of such a network environment 1200. As shown in this figure, the dongle 200 is coupled to a network 210 through an electronic device 205. The network 210 includes a number of network topologies including LAN, WAN, VPN, and/or network-of-networks such as the Internet. Several servers are coupled to the dongle 200 through the networked electronic device 205. Representative examples of these servers include a network hub server 1270, a game content server 1275, a license server 1280, a communication server 1285, and a marketing content server 1290.

The network hub server 1270 typically provides a set of connections and tools to manage data access and flow between a user of the dongle and electronic device and the other servers comprising the online content network. For instance, a service provider typically manages, by using the network hub server 1270, the connection between the dongle and the online game, including the interface for browsing and purchasing new content. The game content server 1275 is typically used to provide game content for the games such as Yu-Gi-Oh! online and Redline Rumble online, which were described above. The licensing server 1280 is employed by some embodiments for the user authentication and/or security code verification that permits the dongle of these embodiments to access the online content and servers. Online licensing includes activities of end users, and also includes the activities of additional content and/or service providers or resellers, in some embodiments.

Some embodiments use the communication server 1285 for communications between the users accessing the network content, such as competitors in an online game, or online moderator, editors, and content providers. Conventional communications protocols include instant messaging, chat, and voice-over-IP. However, additional communication protocols are understood by one of ordinary skill. The marketing content server 1290 is typically used to provide additional subscription, cross sell, and up sell opportunities to the user. In some embodiments, the servers, particularly the network hub server 1270, are provided by KID Interactive, LLC. However, content and one or more servers are often provided by other entities. For instance, a toy manufacturer often provides marketing content related to an online game or online trading cards. This marketing content includes subscription offers and offers for sale of games, toys, and/or additional online network services, for example.

IV. Advantages

In contrast to the plug and play television games described above, most consumer/players already have a personal computer in their homes. These computers tend to be compatible with a wide selection of software titles, including games, of the retail store "box" variety, the download distribution channel variety, or both. Moreover, many computers are already networked and capable of accessing online content and communities. It is currently estimated that a significant portion of the online content and gaming community, approximately 85% of teen and pre-teen aged children ("tweens"), have in-home Internet access. By 2006, it is expected that 50% of tweens will have online access in their bedrooms. As is known in the art, most tweens do not have access to conventional security verification and payment means such as credit cards. Moreover, many prospective online content users in general prefer not to reveal this information online. It would be useful to these consumers for a method and means of accessing content, particularly related to an online community, without revealing personal and financial data, and without the need for sophisticated navigation.

Accordingly, some embodiments of the invention provide for content distribution, such as game distribution, in an alternative hardware/software format, for example, that plugs directly into a personal computer or other suitable electronic device. These embodiments facilitate the delivery of content to the average consumer. For instance, embodiments of the invention provide online access to games and content to the mass market consumer through retail channels. Historically, these consumers were required to navigate to a complex location in cyberspace to reach the content. Moreover, once the consumer reached the appropriate location, the consumer was often further required to enter sensitive personal and/or financial information. As described above, certain embodiments of the invention promote access to secured online content by reducing the requisite amount of navigation skill and secure data for access.

Figure 13:
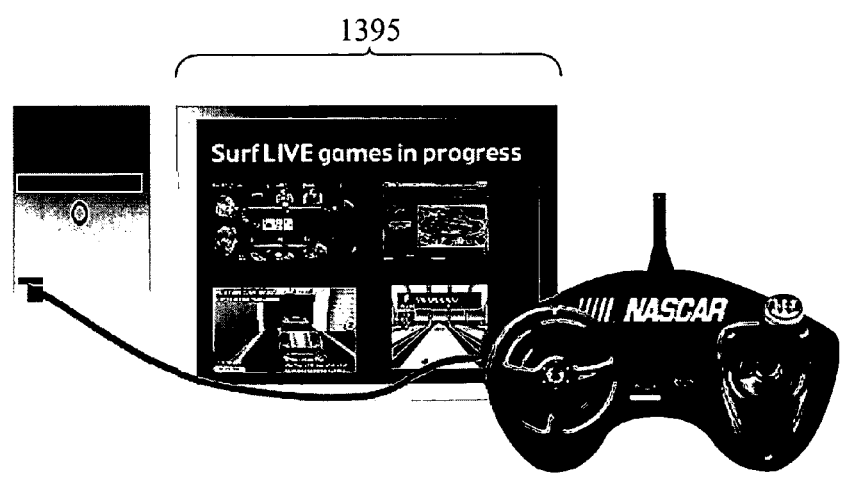
FIG. 13 illustrates the preview feature of some embodiments.

Opening the door to the online communities provides new opportunities to these enabled users. In the gaming realm, online players are provided links to online leader boards to show global rankings for players from around the world. For instance, some embodiments provide a unique "Game Surf" button that allows anyone within any of the games to view current high scores and demos of progress in relationship to the other participants' activities. An exemplary implementation of the Game Surf preview 1395 is illustrated in FIG. 13. Similarly online multi player games provide real time head to head competition across the world. The potential for online games is virtually limitless, from auto racing such as "Indy" and "NASCAR" type events to online card games.

Moreover, the online community extends beyond game play. An online community is often a place where millions of people, often with previous conventional secure access constraints (credit cards), go to play games, compete, see new available content, watch advertisements and make purchases. Further, users obtaining secure access often communicate through a variety of real time means, including voice and text "chat" modes. Online users participate in group activities including trading of online decks of collectibles such as character cards that are often used in conjunction with other activities such as game play.

Further, the hybrid hardware/software and local/online implementations described above are providing greater and more high quality services for the user such as graphics that include 16 to 32 bit images and 3D rendering. These games often interconnect through the network in a like fashion, as described above. However, also unlike the television plug-and-play game consoles mentioned above, game purchases are a discrete relationship for the consumer, which provides a pre-paid pass to an online network gateway that is easily obtained through a familiar secure retail channel. For manufacturers, the hardware implementation of some embodiments provides a proprietary low-cost technology that automatically and securely connects customers to the online (pushed) content. These embodiments further permit manufacturers to license a broad range of products in a variety of markets including games, collectible toys, electronic pets, online trading cards, vehicles, and digital media, for example.

While the invention has been described with reference to numerous specific details, one of ordinary skill in the art will recognize that the invention can be embodied in other specific forms without departing from the spirit of the invention. For instance, the invention has been described primarily in relation to online gaming networks. However, one of ordinary skill will recognize additional implementations such as local gaming and online membership and/or subscription services for content that includes magazines, music, movies, and other media ("e-pets in an e-lifestyle"). Thus, one of ordinary skill in the art will understand that the invention is not to be limited by the foregoing illustrative details, but rather is to be defined by the appended claims.

What is claimed is:

1. An apparatus configured for communication with an electronic device, the apparatus comprising:
  a connector comprising an interface to the electronic device;
  a controller configured to control the interface between the connector and the electronic device;
  a first memory comprising a file system, wherein the controller is configured to automatically recognize the apparatus and to mount the file system to the electronic device when the apparatus connector interfaces with the electronic device; and
  a second memory unavailable to an operating system of the electronic device, the second memory having data for automatic navigation to a predetermined URL location and authentication for automatic login when the apparatus interfaces with the electronic device.

2. The apparatus of claim 1, wherein the contents of the second memory are hidden from an operating system of the electronic device such that the contents are only accessible through the controller.

3. The apparatus of claim 1, wherein the controller permits a write operation to at least one of the first and second memories.

4. The apparatus of claim 1, wherein the controller denies a write operation to at least one of the first and second memories.

5. The apparatus of claim 1, wherein the data comprises a link to a remote URL location.

6. The apparatus of claim 1, wherein the second memory further includes a security code for automated authentication of the apparatus.

7. The apparatus of claim 1, wherein the apparatus provides authorization for accessing secured information by using a unique identifier.

8. The apparatus of claim 1, wherein the apparatus is configured to emulate a compact disc such that the apparatus is mounted as a compact disc on the electronic device.

9. The apparatus of claim 1, wherein the electronic device comprises an operating system, the operating system configured for autorun capability.

10. The apparatus of claim 1, wherein the first memory contains an information file, the information file specifying the element of the file system for automatic execution.

11. The apparatus of claim 1, wherein the connector is a universal serial bus (USB) type connector.

12. The apparatus of claim 1, wherein the first memory comprises read only memory (ROM).

13. The apparatus of claim 1, where the second memory is non volatile.

14. The apparatus of claim 1, wherein the electronic device is a personal computer, a server, a personal digital assistant, a cellular telephone, or a game station.

15. The apparatus of claim 1, wherein the data is configured to launch a browser with the predetermined URL.

16. The apparatus of claim 15, wherein the launched browser uses parameters retrieved from the second memory.

17. The apparatus of claim 1, wherein the first memory contains a startup application, the startup application contains a function call to an externally stored application.

18. The apparatus of claim 17, wherein the startup application performs at least two tasks simultaneously, wherein the at least two tasks include automatically executing a process.

19. A method of interfacing an apparatus having a first and a second memory with an electronic device, wherein the second memory is inaccessible to an operating system of the electronic device, the method comprising:
  coupling the apparatus to the electronic device by using a connector;
  controlling the interface between the connector and the electronic device;
  retrieving a stored file system from the first memory on the apparatus;
  providing the retrieved file system to the electronic device by using the connector;
  automatically recognizing the file system when the connector interfaces with the electronic device;
  automatically executing an element of the file system; and
  using data from the second memory for automatic navigation to a predetermined URL location and authentication for automatic login.

20. The method of claim 19, wherein the contents of the second memory are hidden from an operating system of the electronic device such that the contents are only accessible through the step of controlling the interface between the connector and the electronic device.

21. The method of claim 19, wherein the data comprises a link to a remote URL location.

22. The method of claim 19, wherein the second memory further includes a security code for automated authentication.

23. The method of claim 19, wherein the method further provides authorization for accessing secured information by using a unique identifier.

24. The method of claim 19, further comprising emulating a compact disc such that the file system is mounted as a compact disc on the electronic device.

25. The method of claim 19, wherein the electronic device comprises an operating system, the operating system configured for autorun capability, the autorun capability for launching an application.

26. The method of claim 25, where in the application comprises a browser.

27. The method of claim 19, wherein the first memory contains an information file, the information file specifying the element of the file system for automatic execution.

28. The method of claim 19, wherein the first memory comprises read only memory (ROM).

29. The method of claim 19, where the second memory is non volatile.

30. The method of claim 19, wherein the electronic device is a personal computer, a server, a personal digital assistant, a cellular telephone, or a game station.

31. The method of claim 19, further comprising registering the apparatus.

32. A system for providing content, the system comprising:

an electronic device for receiving the content;

a source location having a unique URL address, the source location including the content; and an apparatus comprising a memory inaccessible to an operating system of the electronic device, the memory including a security code, wherein access to the source location is authenticated using the security code, wherein the apparatus is mounted by an operating system of the electronic device as a read only removable storage medium; and further wherein the apparatus is configured to automatically provide the security code to the source location without user intervention when the apparatus is coupled to the electronic device such that the source location provides the content to the electronic device.

33. The system of claim 32, wherein the apparatus is mounted by an operating system of the electronic device as a writeable removable storage medium.

34. The system of claim 32, wherein the apparatus is mounted by an operating system of the electronic device as a compact disc (CD) type removable storage medium only.

* * * * *